United States Patent
Yamamoto et al.

(10) Patent No.: US 9,688,311 B2
(45) Date of Patent: Jun. 27, 2017

(54) VEHICLE BODY FRONT PORTION STRUCTURE

(71) Applicant: TOYOTA JIDOSHA KABUSHIKI KAISHA, Toyota-shi (JP)

(72) Inventors: Yohei Yamamoto, Nagoya (JP); Koi Hata, Toyota (JP); Yujiro Kaji, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/911,825

(22) PCT Filed: Aug. 12, 2014

(86) PCT No.: PCT/JP2014/071335
§ 371 (c)(1),
(2) Date: Feb. 12, 2016

(87) PCT Pub. No.: WO2015/025781
PCT Pub. Date: Feb. 26, 2015

(65) Prior Publication Data
US 2016/0194031 A1    Jul. 7, 2016

(30) Foreign Application Priority Data
Aug. 21, 2013   (JP) .................. 2013-171423

(51) Int. Cl.
*B62D 21/15* (2006.01)
*B62D 25/02* (2006.01)
*B62D 25/04* (2006.01)

(52) U.S. Cl.
CPC ......... *B62D 21/152* (2013.01); *B62D 25/025* (2013.01); *B62D 25/04* (2013.01)

(58) Field of Classification Search
CPC ..... B62D 21/152; B62D 25/025; B62D 25/04
(Continued)

(56) References Cited

U.S. PATENT DOCUMENTS 6,364,358 B1 * 4/2002 Miller ................. B62D 25/04
                                                    280/784
6,631,942 B1   10/2003 Kitagawa
(Continued)

FOREIGN PATENT DOCUMENTS

JP    7-267148 A    10/1995
JP    2000-16334 A   1/2000
(Continued)

OTHER PUBLICATIONS

International Search Report Issued Oct. 7, 2014 in PCT/JP14/071335 Filed Aug. 12, 2014.

*Primary Examiner* — Jason S Morrow
(74) *Attorney, Agent, or Firm* — Oblon, McClelland, Maier & Neustadt, L.L.P.

(57) ABSTRACT

At a vehicle, rockers and torque boxes are connected, from a front side, to first connecting portions of spacers. Joined portions of the rockers and the torque boxes are reinforced, and a front wheel directly hitting the joined portion at a time of a collision is suppressed. Separation of a joined portion of a front pillar and a dash panel, whose origin is separation of the previously-mentioned joined portion, can be suppressed. Front portions of the spacers are disposed further toward a front side than the joined portions of the front pillars and the dash panel. Therefore, the front wheel first hits the spacer, and collision load is transmitted to the rocker and the torque box, and thus, input of an excessive collision load to the dash panel is suppressed. Because the first connecting portions extend in a vehicle transverse direction, the spacers becoming large can be suppressed.

7 Claims, 6 Drawing Sheets

(58) Field of Classification Search
USPC .............. 296/187.1, 193.05, 193.06, 203.03, 296/187.12
See application file for complete search history.

(56) References Cited

U.S. PATENT DOCUMENTS

| | | | |
|---|---|---|---|
| 8,469,442 B1 | 6/2013 | Pencak et al. | |
| 2014/0001790 A1* | 1/2014 | Zischke | B62D 25/2018 296/187.03 |
| 2016/0016612 A1* | 1/2016 | Torikawa | B62D 25/025 280/784 |
| 2016/0083015 A1* | 3/2016 | Kiyoshita | B62D 25/025 296/187.09 |
| 2016/0244098 A1* | 8/2016 | Kanemori | B62D 21/152 |

FOREIGN PATENT DOCUMENTS

| | | |
|---|---|---|
| JP | 2003-2247 A | 1/2003 |
| JP | 2010-47178 A | 3/2010 |
| JP | 2011-136593 A | 7/2011 |

\* cited by examiner

VEHICLE BODY FRONT PORTION STRUCTURE

TECHNICAL FIELD

The present invention relates to a vehicle body front portion structure that is around the front end portion of a rocker.

BACKGROUND ART

In a case in which, in a front collision of a vehicle, a collision body collides with a portion that is further toward the vehicle transverse direction outer side than the front side member (a so-called small overlap collision), the collision energy cannot be absorbed by deformation of the front side member. Therefore, the front wheel moves toward the vehicle rear side due to the collision body, and the front wheel hits the dash panel and the like.

In contrast, in the vehicle body front portion structure disclosed in following Patent Document 1, a reinforcing panel (connecting member) is provided at the rear side of the front wheel. This reinforcing panel (connecting member) is joined to the rocker, the front pillar, the dash panel, the apron upper and the torque box. Due thereto, in a small overlap collision of a vehicle that is equipped with this vehicle body front portion structure, the front wheel that has moved toward the vehicle rear side hits the reinforcing panel.

PRIOR ART DOCUMENTS

Patent Documents

[Patent Document 1] Japanese Patent Application Laid-Open (JP-A) No. 2000-016334
[Patent Document 2] JP-A No. H07-267148
[Patent Document 3] JP-A No. 2010-047178
[Patent Document 4] JP-A No. 2011-136593

SUMMARY OF INVENTION

Technical Problem

However, in the above-described vehicle body front portion structure, when the front wheel hits the reinforcing panel at the time of a small overlap collision, there is the possibility that the joined portion of the vehicle transverse direction outer side end portion of the dash panel will separate. Namely, as shown in FIG. 3 of aforementioned Patent Document 1, in the above-described vehicle body front portion structure, the vehicle transverse direction outer side end portion of the dash panel is disposed at the vehicle front side of the front pillar. Further, the reinforcing panel extends toward the vehicle front side from the front pillar, and is bent toward the vehicle transverse direction inner side, and is joined, together with the outer panel, to the vehicle transverse direction outer side end portion of the dash panel. Further, generally, a dash panel and an outer panel are structured from plate materials that are relatively low-strength (whose plate thicknesses are thin), and therefore, when the front wheel hits the reinforcing panel, the dash panel, together with the reinforcing panel, greatly deforms toward the front pillar side. Due thereto, in the above-described vehicle body front portion structure in which the dash panel is disposed at the vehicle front side of the front pillar, there is the possibility that, accompanying the deformation of the reinforcing panel and the dash panel, the joined portion of the vehicle transverse direction outer side end portion of the dash panel will separate.

Further, because the reinforcing panel is joined to the rocker, the front pillar, the dash panel, the apron upper and the rocker as described above, there is also the problem that the reinforcing panel becomes large.

In view of the above-described circumstances, an object of the present invention is to provide a vehicle body front portion structure that can suppress separation of the joined portion of a front pillar and a dash panel at the time of a small overlap collision, while suppressing an increase in size of a connecting member.

Solution to Problem

A vehicle body front portion structure relating to a first aspect comprises: a pair of rockers that are provided at vehicle transverse direction both sides of a vehicle lower portion, and that extend in a vehicle longitudinal direction; a pair of front pillars that extend toward a vehicle upper side from front end portions of the rockers; a dash panel whose vehicle transverse direction outer side end portions are joined to front end portions of the front pillars, and that connects the pair of front pillars in a vehicle transverse direction; torque boxes that are provided at a vehicle lower side of the dash panel and at vehicle transverse direction inner sides of the rockers, and that are joined to the front end portions of the rockers; and connecting members that are provided at vehicle front sides of the rockers and the torque boxes, and whose front portions are disposed further toward a vehicle front side than the vehicle transverse direction outer side end portions of the dash panel, and that have transverse direction connecting portions that extend in the vehicle transverse direction and connect the rockers and the torque boxes.

In the vehicle body front portion structure relating to the first aspect, the rockers that extend in the vehicle longitudinal direction are provided at the vehicle transverse direction both sides of the vehicle lower portion, and the front pillars extend toward the vehicle upper side from the front end portions of the respective rockers. Further, the vehicle transverse direction outer side end portions of the dash panel are joined to the front end portions of the front pillars, and the dash panel connects the pair of front pillars in the vehicle transverse direction. Namely, the dash panel extends from the front end portions of the front pillars toward the vehicle transverse direction inner side. Moreover, the torque boxes are provided at the vehicle lower side of the dash panel and the vehicle transverse direction inner sides of the rockers, and the torque boxes are joined to the front end portions of the rockers.

Here, the connecting members are provided at the vehicle front sides of the rockers and the torque boxes. The connecting members have transverse direction connecting portions that extend in the vehicle transverse direction, and the rockers and the torque boxes are connected by the transverse direction connecting portions. Due thereto, the joined portions of the rockers and the torque boxes are reinforced by the connecting members. Further, when a front wheel moves toward the vehicle rear side at the time of a small overlap collision, the front wheel hits the connecting member, and therefore, the front wheel directly hitting the joined portion of the rocker and the torque box is suppressed. Due thereto, separation at the joined portion of the rocker and the torque box is suppressed. Accordingly, separation of the joined portion of the front pillar and the dash panel, whose origin is separation at the joined portion of the rocker and the torque box, can be suppressed.

Moreover, the front portions of the connecting members are disposed further toward the vehicle front side than the vehicle transverse direction outer side end portions of the dash panel. Therefore, there can be made to be a structure in which the front wheel hits the connecting member before the dash panel. Further, due to the front wheel hitting the connecting member, the collision load is transmitted to the rocker that forms the skeleton of the vehicle body and to the torque box, and therefore, excessive collision load being inputted to the dash panel is suppressed. Due thereto, separation of the joined portion of the front pillar and the dash panel can be suppressed.

Moreover, the transverse direction connecting portions extend in the vehicle transverse direction, and connect the rockers and the torque boxes. Therefore, an increase in size of the connecting member can be suppressed as compared with a reinforcing panel such as that of the prior art.

In a vehicle body front portion structure relating to a second aspect, in the vehicle body front portion structure relating to the first aspect, the connecting members themselves have closed cross-sectional structures.

In the vehicle body front portion structure relating to the second aspect, because the connecting members have closed cross-sectional structures, at the time of a small overlap collision, the collision load from the front wheel can be received efficiently by the connecting member.

In a vehicle body front portion structure relating to a third aspect, in the vehicle body front portion structure relating to the first aspect or the second aspect, the connecting members have vertical direction connecting portions that extend toward a vehicle upper side from vehicle transverse direction outer side end portions of the transverse direction connecting portions, and that connect the rockers and the front pillars.

In the vehicle body front portion structure relating to the third aspect, the connecting members have the vertical direction connecting portions in addition to the transverse direction connecting portions. These vertical direction connecting portions extend toward the vehicle upper side from the vehicle transverse direction outer side end portions of the transverse direction connecting portions, and connect the rockers and the front pillars. Therefore, the vertical direction connecting portions can be disposed in vicinities of the vehicle transverse direction outer sides of the joined portions of the front pillars and the dash panel. Due thereto, the front wheel, that has moved toward the vehicle rear side at the time of a small overlap collision, hits the vertical direction connecting portion. Therefore, the vertical direction connecting portion receives this collision load, and can transmit this collision load to the front pillar that is a skeleton member of the vehicle body. Accordingly, separation of the joined portion of the front pillar and the dash panel can be suppressed more.

In a vehicle body front portion structure relating to a fourth aspect, in the vehicle body front portion structure relating to the third aspect, bent portions are formed at front portions of the vertical direction connecting portions, and the bent portions are formed in concave shapes that open toward a vehicle front side as seen in a side view.

In the vehicle body front portion structure relating to the fourth aspect, the bent portions, that are formed at the front portions of the vertical direction connecting portions, are formed in concave shapes that open toward the vehicle front side as seen in a side view. Due thereto, for example, by forming the bent portions in substantial V-shapes as seen in a side view, the front wheel that has moved toward the vehicle rear side can hit regions at two places that are the upper portion and the lower portion of the bent portion. Due thereto, the collision load that is inputted from the front wheel to the connecting member can be dispersed.

In a vehicle body front portion structure relating to a fifth aspect, in the vehicle body front portion structure relating to any one of the first aspect through the fourth aspect, the connecting members are fastened and fixed to reinforcing members that reinforce the vehicle body.

In the vehicle body front portion structure relating to the fifth aspect, the connecting members are fastened and fixed to the reinforcing members that reinforce the vehicle body. Therefore, the joining forces with the vehicle body at the connecting members can be ensured.

In a vehicle body front portion structure relating to a sixth aspect, in the vehicle body front portion structure relating to any one of the first aspect through the fifth aspect, projecting portions, that project-out toward a vehicle front side with respect to the rockers and the torque boxes and that open toward a vehicle rear side as seen in a plan view, are formed integrally with the connecting members, and joined portions of the rockers and the torque boxes are disposed within the projecting portions.

In the vehicle body front portion structure relating to the sixth aspect, the projecting portions are formed integrally with the connecting members, and the projecting portions open toward the vehicle rear side as seen in a plan view, and project-out toward the vehicle front side with respect to the rockers and the torque boxes. Therefore, the projecting portions are structured like vertical beads, and thus, the strength of the projecting portions with respect to collision load toward the vehicle rear side can be increased. Further, the joined portions of the rockers and the torque boxes are disposed within the projecting portions. Therefore, because the front wheel hits the high-strength projecting portion at the time of a small overlap collision, separation of the joined portion of the rocker and the torque box can be suppressed more, and accordingly, separation of the joined portion of the front pillar and the dash panel can be suppressed effectively.

Advantageous Effects of Invention

In accordance with the vehicle body front portion structure relating to the first aspect, separation at the joined portion of the front pillar and the dash panel at the time of a small overlap collision can be suppressed, while an increase in size of the connecting member is suppressed.

In accordance with the vehicle body front portion structure relating to the second aspect, at the time of a small overlap collision, the collision load from the front wheel can be received efficiently by the connecting member.

In accordance with the vehicle body front portion structure relating to the third aspect, separation of the joined portion of the front pillar and the dash panel can be suppressed more.

In accordance with the vehicle body front portion structure relating to the fourth aspect, collision load that is inputted from a front wheel to the connecting member can be dispersed.

In accordance with the vehicle body front portion structure relating to the fifth aspect, the joining force with the vehicle body at the connecting member can be ensured.

In accordance with the vehicle body front portion structure relating to the sixth aspect, separation of the joined portion of the rocker and the torque box can be suppressed more, and accordingly, separation of the joined portion of the front pillar and the dash panel can be suppressed effectively.

DESCRIPTION OF EMBODIMENTS

Figure 1:
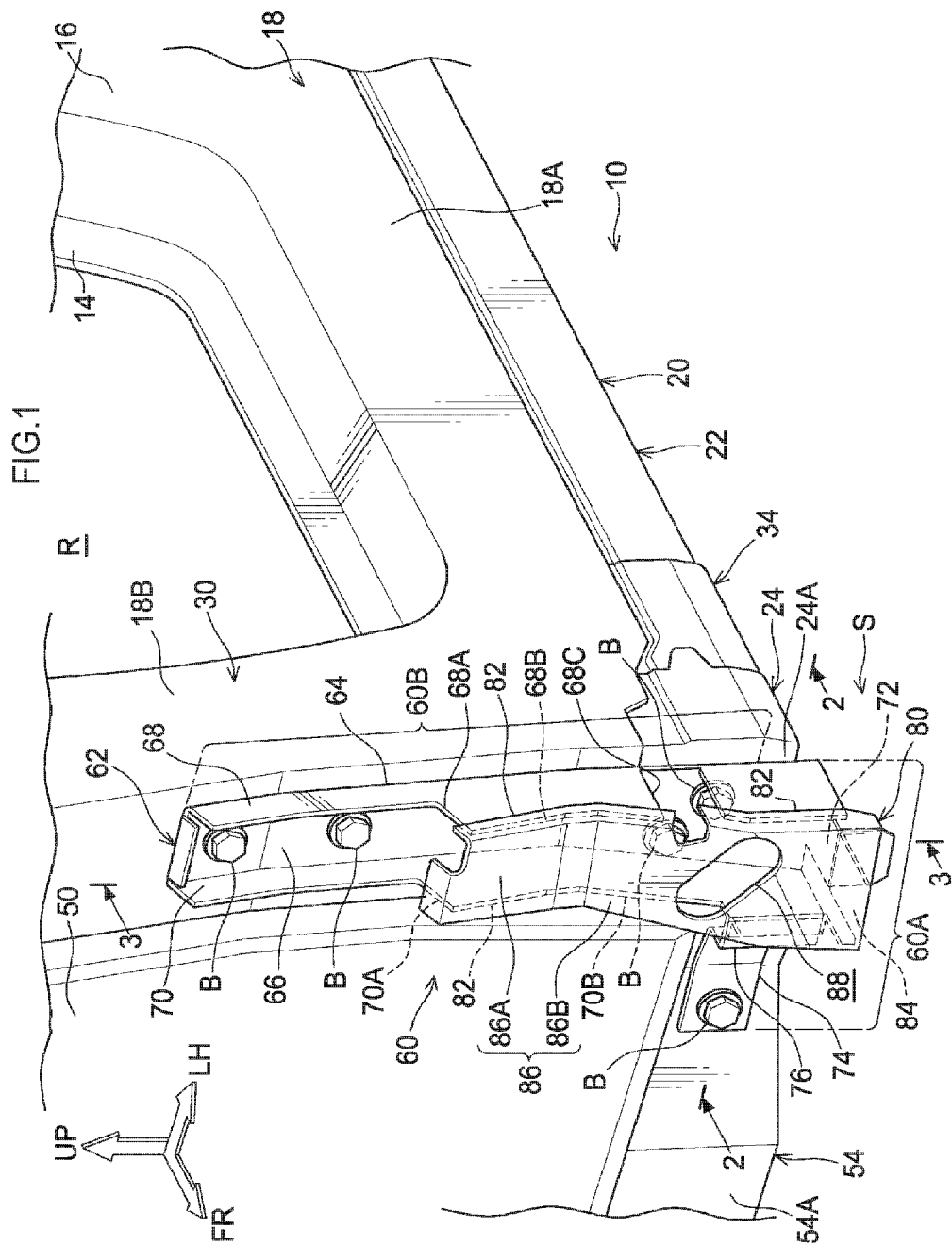
FIG. 1 is a perspective view seen obliquely from a vehicle left front side and showing main portions of a vehicle to which a vehicle body front portion structure relating to a present embodiment is applied.

A vehicle (automobile) 10, to which a vehicle body front portion structure S relating to an embodiment of the present invention is applied, is described on the basis of the drawings. Note that arrow FR that is shown appropriately in the drawings indicates the vehicle front side, arrow LH indicates the vehicle left side (a vehicle transverse direction one side), and arrow UP indicates the vehicle upper side. Further, the vehicle body front portion structure S is applied to regions that are further toward the vehicle rear side than front wheels 12 of the vehicle 10, and is structured so as to be symmetrical at the left and the right in the vehicle transverse direction. Therefore, the vehicle left side portion of FIG. 10 is described, and description of the vehicle right side portion of the vehicle 10 is omitted.

As shown in FIG. 1, the vehicle 10 is structured to include rockers 20 that extend in the vehicle longitudinal direction at the vehicle transverse direction both sides of the lower portion of the vehicle 10, and front pillars 30 that extend toward the vehicle upper side from the front end portions of the rockers 20. Further, the vehicle 10 has a dash panel 50 that partitions an engine room and a vehicle cabin R of the vehicle 10, torque boxes 54 that are provided at the vehicle transverse direction outer side portions of the lower end portion of the dash panel 50, and spacers 60 that serve as connecting members. The respective structures thereof are described hereinafter.

The rocker 20 and the front pillar 30 form skeleton members of the vehicle body, and, together with a roof side rail (not illustrated) and a center pillar (B pillar) 16, form a door opening portion 14 for passenger ingress/egress. This door opening portion 14 is formed at the side portion of the vehicle cabin R. Further, the outer walls at the vehicle transverse direction outer ends of the rocker 20 and the front pillar 30 are structured by a side outer panel 18 that is a large pressed part that is used in common therefor.

Figure 4:
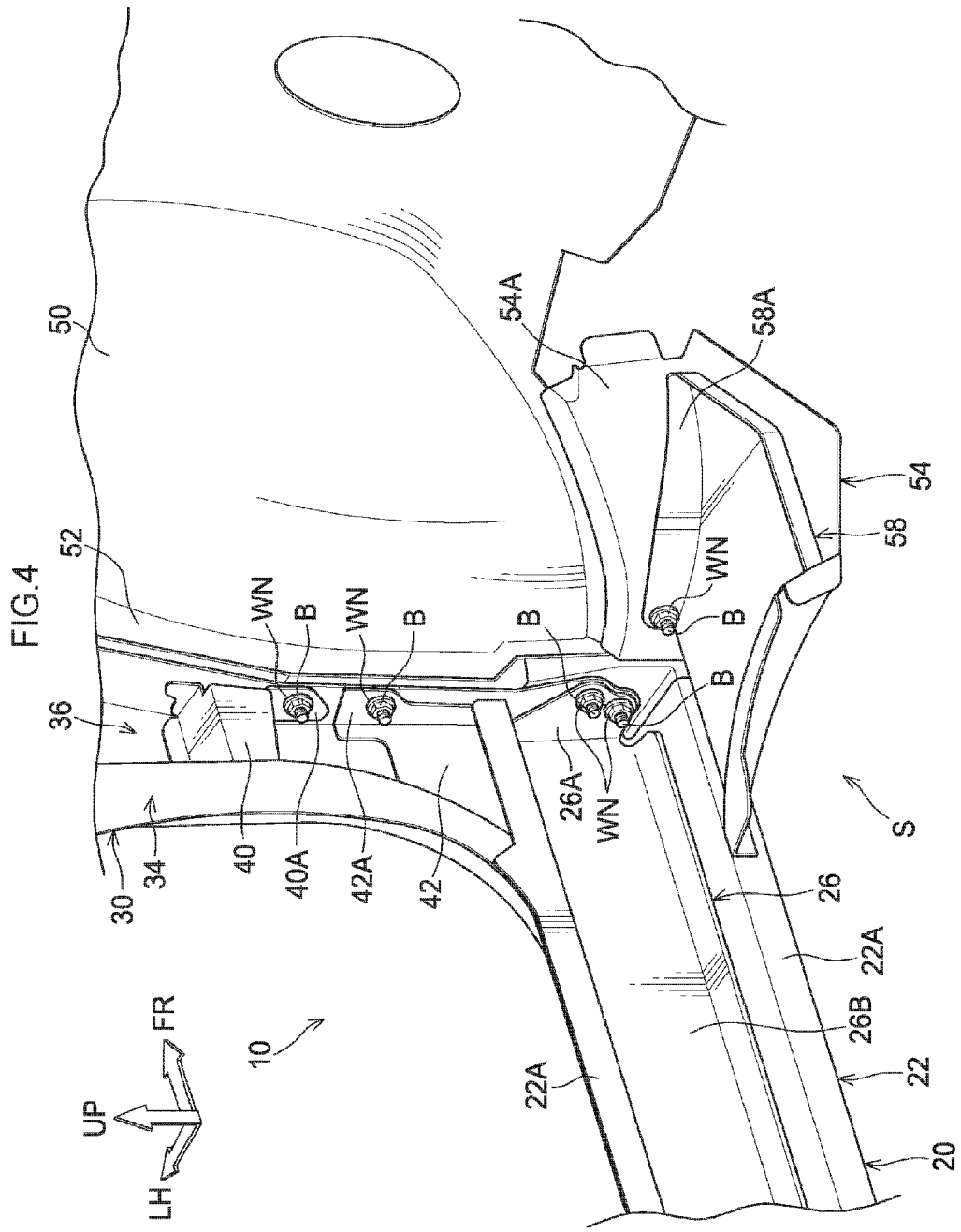
FIG. 4 is a perspective view in which a rocker and a front pillar shown in FIG. 1 are seen from a vehicle cabin inner side.

The rocker 20 has a rocker outer reinforcement (hereinafter called "rocker outer R/F") 22. As shown in FIG. 4, the rocker outer R/F 22 is formed in a hat shape in cross-section that opens toward the vehicle transverse direction inner side as seen in a front view, and flange portions 22A are integrally formed respectively at the upper end portion and the lower end portion of the rocker outer R/F 22. Further, a rocker inner panel (not illustrated), that is disposed at the vehicle transverse direction inner side of the upper and lower flange portions 22A, is joined to the flange portions 22A. Due thereto, a closed cross-section is formed by the rocker outer R/F 22 and the rocker inner panel.

As shown in FIG. 1, a rocker outer portion 18A that structures the rocker 20 is disposed at the side outer panel 18 at the outer side of the rocker outer R/F 22. The rocker outer portion 18A is formed substantially in a reverse L-shape as seen in a front view seen from the vehicle front side, and is joined to the rocker outer R/F 22 by spot welding or the like. Note that there may be a structure in which the rocker outer portion 18A is formed in a hat-shape in cross-section that opens toward the vehicle transverse direction inner side, and a closed cross-sectional shape is formed by the rocker outer portion 18A and the rocker inner panel.

A front cover 24 is provided at the front end portion of the rocker outer R/F 22. The front cover 24 is formed substantially in a reverse L-shape as seen in a plan view seen from the vehicle upper side, so as to cover the front end portion of the rocker outer R/F 22 from the vehicle transverse direction outer side and the vehicle front side, and is joined to the rocker outer R/F 22 by spot welding or the like. Further, the vehicle transverse direction inner side end portion of a front wall portion 24A of the front cover 24 is bent toward the vehicle front side as seen in a plan view, and a flange portion 24B (see FIG. 2) is formed integrally therewith.

Moreover, as shown in FIG. 4, a rocker inner reinforcement (hereinafter called "rocker inner R/F") 26 that serves as a "reinforcing member" is provided within the rocker outer R/F 22. The rocker inner R/F 26 is formed in a substantially U-shape in cross-section that opens toward the vehicle transverse direction inner side as seen in a front view, and is joined to the rocker outer R/F 22 by spot welding or the like. Further, a front wall portion 26A is formed integrally with the rocker inner R/F 26. The front wall portion 26A extends toward the vehicle transverse direction inner side from the front end of a side wall portion 26B of the rocker inner R/F 26, and is disposed at the vehicle rear side of the front wall portion 24A of the front cover 24. Further, a pair of weld nuts WN for fastening and fixing the spacer 60 that is described later are provided at the rear surface of the front wall portion 24A.

On the other hand, as shown in FIG. 1, the side outer panel 18 has a front pillar outer portion 18B that structures the front pillar 30. The front pillar outer portion 18B is formed in a hat shape in cross-section that opens toward the vehicle transverse direction inner side as seen in a plan view. A front pillar inner panel 32 (not shown in FIG. 1) is joined to the vehicle transverse direction inner side of this front pillar outer portion 18B. Due thereto, the front pillar 30 is formed in a closed cross-sectional shape. Further, the lower end portion of the front pillar inner panel 32 extends to the front end portion of the rocker 20, and is disposed adjacent to the vehicle transverse direction inner side of the front end portion of the rocker outer R/F 22 (see FIG. 2). Further, the front pillar inner panel 32 is joined to the flange portion 24B of the front cover 24.

Figure 5:
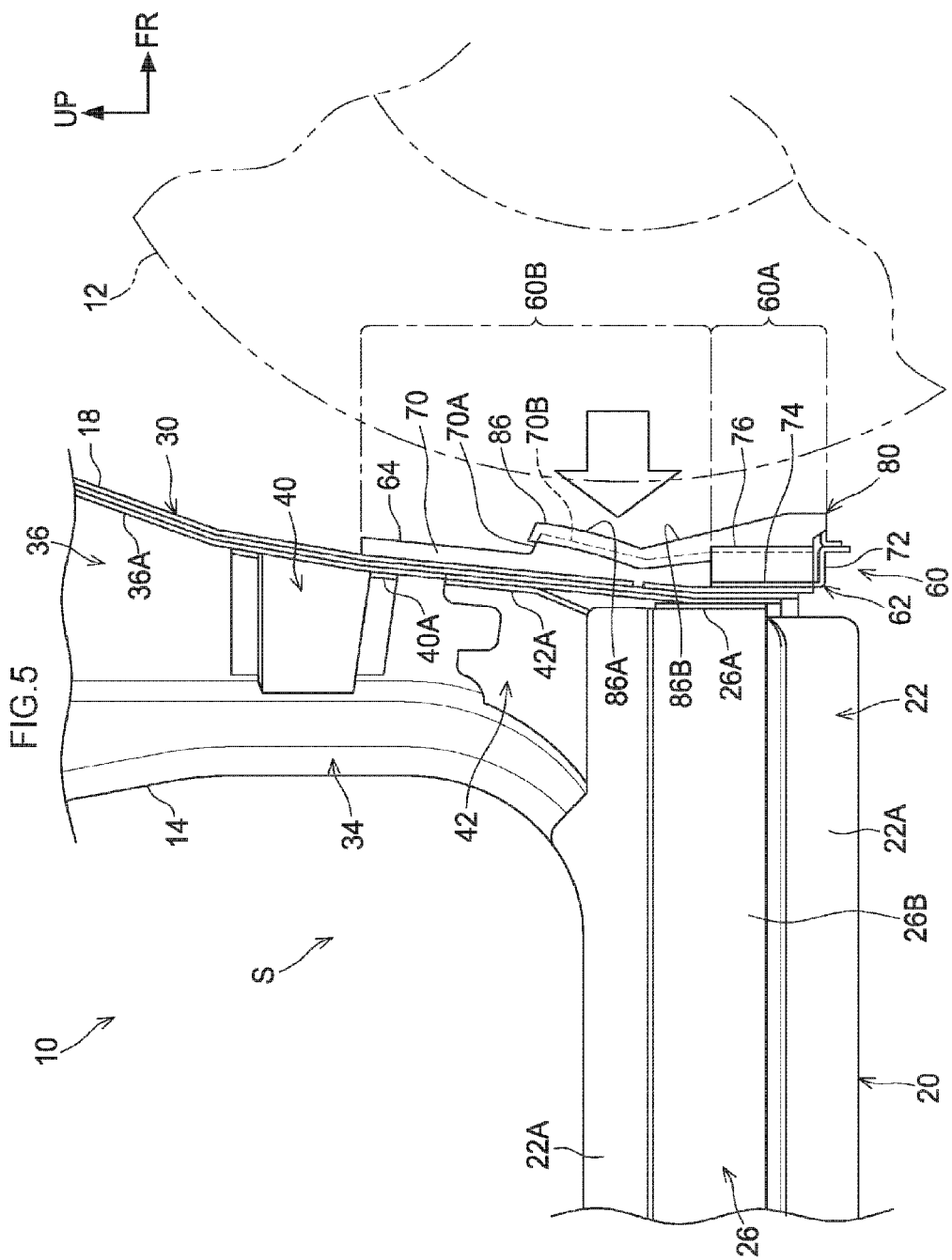
FIG. 5 is a side view in which the rocker and the front pillar shown in FIG. 1 are seen from the vehicle cabin inner side.

As shown in FIG. 4 and FIG. 5, a front pillar outer reinforcement (hereinafter called "pillar outer R/F") 34 is provided within the closed cross-section of the front pillar 30. The pillar outer R/F 34 is formed in a hat shape in cross-section that opens toward the vehicle transverse direction inner side as seen in a plan view. The vehicle transverse direction inner side portion of the pillar outer R/F 34 is joined to the front pillar inner panel 32 by spot welding or the like.

Further, a hinge reinforcement (hereinafter called "hinge R/F") 36 is provided at the inner side of the pillar outer R/F 34. The hinge R/F 36 is formed in a substantial U-shape in cross-section that opens toward the vehicle transverse direction inner side as seen in a plan view, and is joined to the pillar outer R/F 34 by spot welding or the like. Further, a front wall portion 36A of the hinge R/F 36 extends to the front end portion of the rocker 20, and the lower end portion of the front wall portion 36A is disposed between the front wall portion 26A of the rocker inner R/F 26 and the front wall portion 24A of the front cover 24.

A bulkhead 40 serving as a "reinforcing member" is provided within the hinge R/F 36. The bulkhead 40 is formed in a substantial hat shape in cross-section that opens toward the vehicle transverse direction outer side as seen in a front view, and is joined to the hinge R/F 36 by spot welding or the like. Further, the bulkhead 40 spans between the front wall portion 36A and the rear wall portion of the hinge R/F 36, and reinforces the hinge R/F 36 with respect to load in the vehicle longitudinal direction. Moreover, a mounting piece 40A that is bent toward the vehicle lower side is formed at the front end portion of the lower wall portion of the bulkhead 40. This mounting piece 40A is disposed adjacent to the vehicle rear side of the front wall portion 36A of the hinge R/F 36. Further, the weld nut WN for fixing the spacer 60 that is described later is fixed to the rear surface of the mounting piece 40A.

A gusset 42 that serves as a "reinforcing member" is provided within the hinge R/F 36 at the vehicle lower side of the bulkhead 40. The gusset 42 is formed in a substantially trapezoidal plate shape as seen in a side view, and is joined to the hinge R/F 36 by spot welding or the like. Further, in the same way as the bulkhead 40, the gusset 42 spans between the front wall portion 36A and the rear end portion of the hinge R/F 36, and reinforces the hinge R/F 36 with respect to load in the vehicle longitudinal direction. Moreover, a front wall portion 42A is formed integrally with the front end portion of the gusset 42. This front wall portion 42A extends from the front end of the gusset 42 toward the vehicle transverse direction inner side, and is disposed adjacent to the vehicle rear side of the front wall portion 36A of the hinge R/F 36. Further, the weld nut WN for fixing the spacer 60 that is described later is fixed to the rear surface of the front wall portion 42A. Note that, although not illustrated, a lower wall portion that is bent toward the vehicle transverse direction inner side is formed integrally with the lower end portion of the gusset 42, and this lower wall portion is formed continuously with the front wall portion 42A. Further, the lower wall portion of the gusset 42 is fixed to the rocker outer R/F 22 by spot welding or the like.

On the other hand, as shown in FIG. 4, the dash panel 50 is provided at the vehicle transverse direction inner side of the front pillar 30. The dash panel 50 is disposed with the plate thickness direction thereof substantially being the vehicle longitudinal direction, and partitions the engine room and the vehicle cabin R interior of the vehicle 10. Further, the vehicle transverse direction outer side end portion of the dash panel 50 is bent toward the vehicle rear side and is joined to the front pillar 30 (the front pillar inner panel 32). Further, the joined portion of the dash panel 50 and the front pillar 30 is made to be a joined portion 52.

Figure 2:
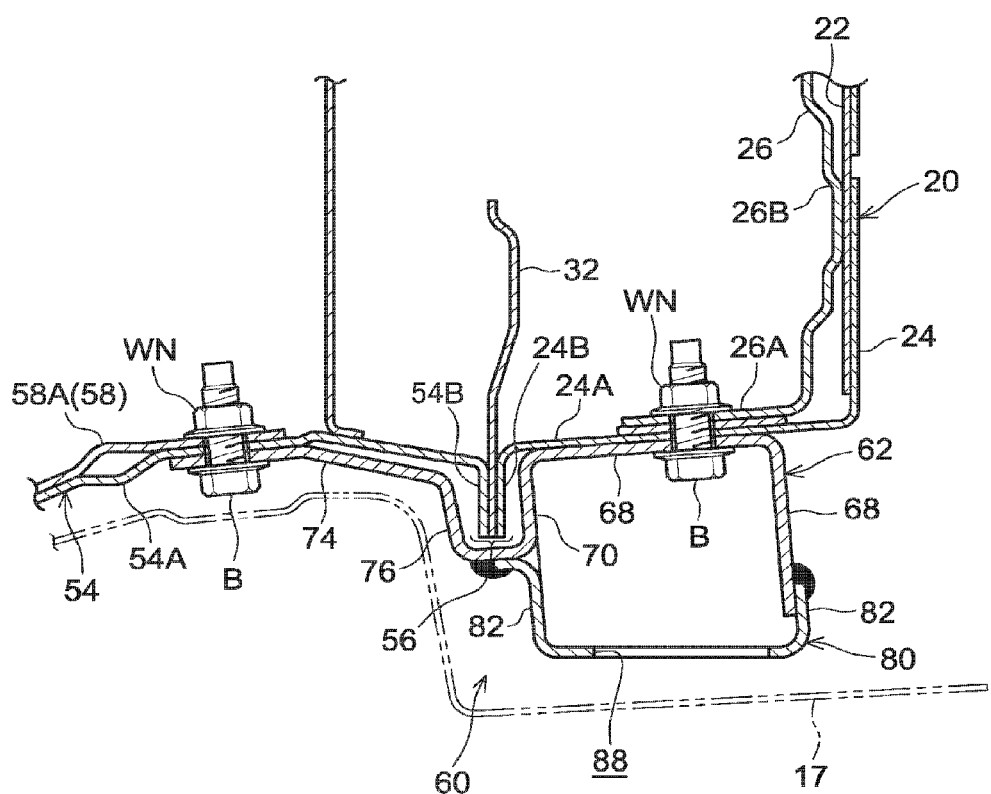
FIG. 2 is a plan sectional view (a cross-sectional view along line 2-2 of FIG. 1) in which a spacer shown in FIG. 1 is enlarged.

The torque box 54 is disposed at the vehicle transverse direction inner side of the rocker 20, at the vehicle lower side of the dash panel 50. The torque box 54 is formed in a substantial hat shape in cross-section that opens toward the vehicle upper side as seen in a side view. Further, the front end portion of the torque box 54 is joined by spot welding or the like to the vehicle transverse direction outer side portion of the lower end portion of the dash panel 50. Further, as shown in FIG. 2, a flange portion 54B is formed integrally with the vehicle transverse direction outer side end portion at a front wall portion 54A of the torque box 54. This flange portion 54B is bent toward the vehicle front side and is joined to the front pillar inner panel 32. Due thereto, the rocker 20 and the torque box 54 are joined via the front pillar inner panel 32, and this joined portion is made to be a joined portion 56.

Further, as shown in FIG. 4, a torque box inner reinforcement (hereinafter called "torque box inner R/F") 58 that serves as a "reinforcing member" is provided within the torque box 54. The torque box inner R/F 58 is formed in a substantially rectangular plate shape, and is disposed on the torque box 54 within the plate thickness direction thereof being the vehicle vertical direction. Further, a front wall portion 58A that is bent toward the vehicle upper side is formed at the front end portion of the torque box inner R/F 58, and the weld nut WN for fixing the spacer 60 that is described later is fixed to the rear surface of the front wall portion 58A.

The spacer 60 that is a main portion of the present invention is described next.

Figure 3:
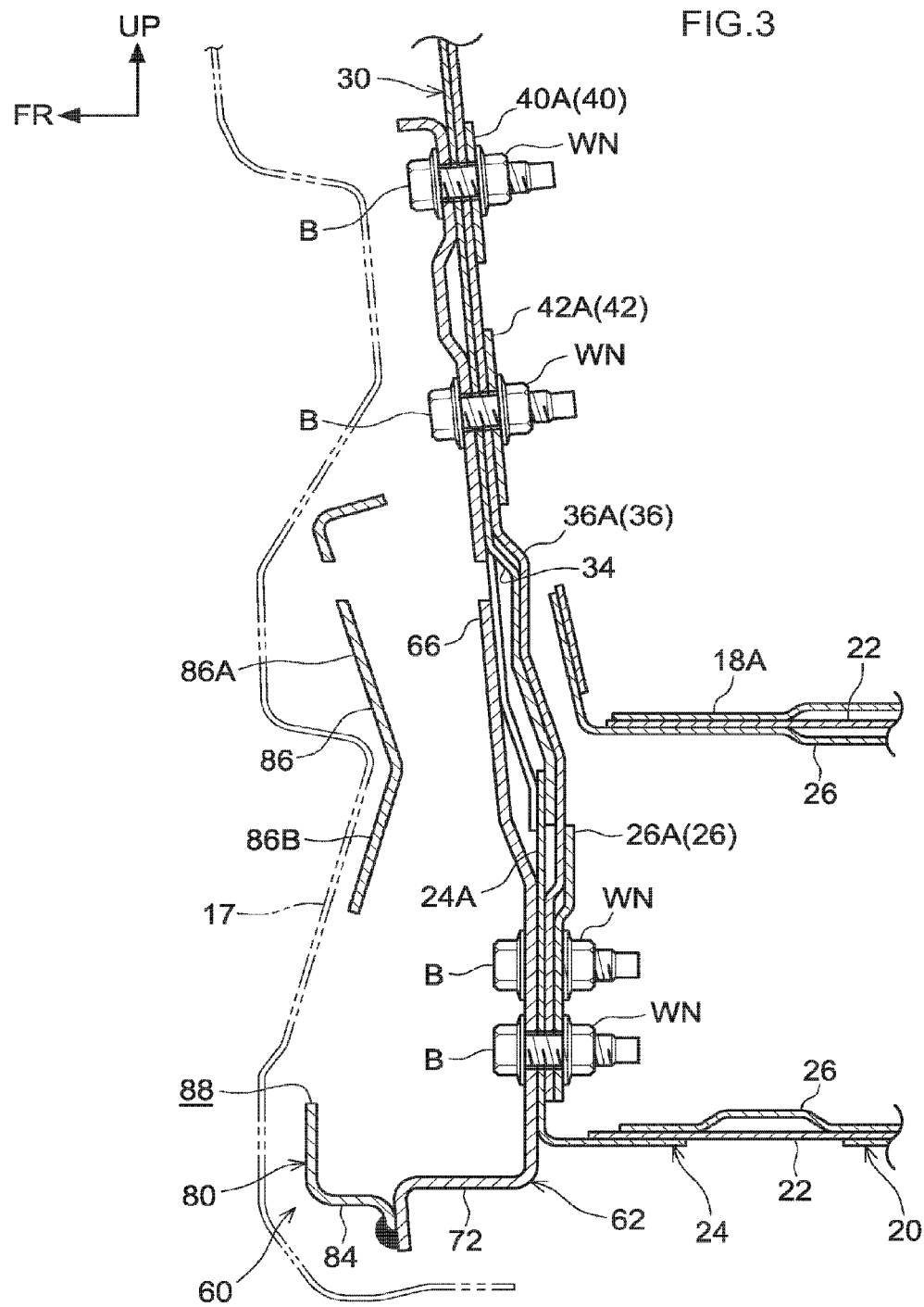
FIG. 3 is a side sectional view (a cross-sectional view along line 3-3 of FIG. 1) in which the spacer shown in FIG. 1 is enlarged.

As shown in FIG. 1 through FIG. 3, the spacer 60 is formed in a substantially reverse L-shape as seen in a front view, and is disposed at the vehicle front side of the rocker 20, the front pillar 30 and the torque box 54, and at the vehicle rear side of a fender liner 17 (see FIG. 2 and FIG. 3). Further, the spacer 60 is structured to include a rear spacer 62 that structures the rear portion of the spacer 60, and a front spacer 80 that structures the front portion of the spacer 60.

The rear spacer 62 is structured from a high-strength metal plate material, and is formed in a substantially reverse L-shape as seen in a front view. Further, the rear spacer 62 is structured to include a rear spacer main body portion 64 that extends in the vehicle vertical direction in a vicinity of the vehicle transverse direction outer side of the joined portion 52 of the front pillar 30 and the dash panel 50, and a rear spacer extended portion 74 that extends toward the vehicle transverse direction inner side from the lower end portion of the rear spacer main body portion 64.

The rear spacer main body portion 64 is formed in a substantial U-shape that opens toward the vehicle front side as seen in a plan view. Concretely, the rear spacer main body portion 64 is structured to include a rear wall portion 66 that is disposed with the plate thickness direction thereof being the vehicle longitudinal direction and that extends in the vehicle vertical direction, an outer side wall portion 68 that extends toward the vehicle front side from the vehicle transverse direction outer side end of the rear wall portion 66, and an inner side wall portion 70 that extends toward the vehicle front side from the vehicle transverse direction inner side end of the rear wall portion 66.

Four mounting holes (not illustrated) are formed so as to pass-through the rear wall portion 66, in correspondence with the weld nuts WN that are provided at the above-described rocker inner R/F 26, bulkhead 40 and gusset 42. Further, bolts B are inserted into the mounting holes from the vehicle front side, and the rear wall portion 66 (the spacer 60) is fastened and fixed to the rocker 20 and the front pillar 30 by the bolts B.

At the outer side wall portion 68, the height dimension at the upper portion thereof is set to be lower than the height dimension at the lower portion thereof. Namely, a step portion 68A, that is formed in a substantial crank shape as seen in a side view, is formed at the front end portion (the outer peripheral portion) of the outer side wall portion 68. Further, a groove portion 68B is formed in a vehicle vertical direction intermediate portion of the front end portion of the outer side wall portion 68 (in detail, in the region at the vehicle lower side of the step portion 68A). The groove portion 68B is formed in a substantial V-shape that opens toward the vehicle front side as seen in a side view. Moreover, a cut-out portion 68C is formed in the lower portion of the outer side wall portion 68. The cut-out portion 68C is formed in a substantial U-shape that opens toward the vehicle front side as seen in a side view.

The inner side wall portion 70 is structured substantially similarly to the outer side wall portion 68, except for the cut-out portion 68C of the outer side wall portion 68. Namely, a step portion 70A that is formed in a substantial crank shape, and a groove portion 70B that is formed in a substantial V-shape, are formed in the front end portion (the outer peripheral portion) of the outer side wall portion 68.

Further, a lower wall portion 72 is formed integrally with the lower end portion of the rear spacer main body portion 64. The lower wall portion 72 is bent in a substantial L-shape toward the vehicle front side as seen in a side view. Concretely, the lower wall portion 72 extends toward the vehicle front side from the lower end of the rear spacer main body portion 64, and the distal end portion of the lower wall portion 72 is bent toward the vehicle lower side.

The rear spacer extended portion 74 extends in the vehicle transverse direction, with the plate thickness direction thereof substantially being the vehicle longitudinal direction. Further, the vehicle transverse direction outer side end portion at the rear spacer extended portion 74 is bent in a substantial crank shape toward the vehicle front side as seen in a plan view, and is joined to the front end of the lower end portion of the inner side wall portion 70. Due thereto, a projecting portion 76, that projects toward the vehicle front side as seen in a plan view, is formed at the rear spacer 62, and the projecting portion 76 is formed in a substantial U-shape in cross-section that opens toward the vehicle rear side. Further, the joined portion 56 of the rocker 20 and the torque box 54 is disposed within this projecting portion 76.

Further, a mounting hole (not illustrated) is formed to pass-through the rear spacer extended portion 74 at a position corresponding to the weld nut WN that is provided at the torque box inner R/F 58. Further, the bolt B is inserted into the mounting hole from the vehicle front side, and the rear spacer extended portion 74 (the spacer 60) is fastened and fixed to the torque box 54 by the bolt B.

On the other hand, the front spacer 80 is disposed at the vehicle front side of the substantially lower half portion of the rear spacer main body portion 64, and extends in the vehicle vertical direction. This front spacer 80 is structured from a high-strength metal plate material, and is formed in a substantial U-shape in cross-section that opens toward the vehicle rear side as seen in a plan view. Further, a pair of side walls 82 of the front spacer 80 are respectively disposed at the spacer 60 transverse direction outer sides of the outer side wall portion 68 and the inner side wall portion 70 of the rear spacer 62, and are joined to the outer side wall portion 68 and the inner side wall portion 70 by arc welding or the like. Due thereto, a closed cross-sectional shape that is a substantially rectangular annulus is formed at the spacer 60 by the front spacer 80 and the rear spacer 62 (the rear spacer main body portion 64). Moreover, at the vehicle rear side of the front wheel 12, the front spacer 80 projects-out toward the vehicle front side with respect to the rocker 20, the front pillar 30, the torque box 54 and the dash panel 50. Due thereto, the front spacer 80 is disposed further toward the vehicle front side than the vehicle transverse direction outer side end portion of the dash panel 50 (i.e., the joined portion 52).

Further, a lower wall portion 84 is formed integrally with the lower end portion of the front spacer 80. The lower wall portion 84 is bent in a substantial L-shape from the front spacer 80 toward the vehicle rear side. Concretely, the lower wall portion 84 extends toward the vehicle rear side from the lower end of the front spacer 80, and the distal end portion of the lower wall portion 84 is bent toward the vehicle lower side. Further, the distal end portion of the lower wall portion 84 is disposed so as to face the distal end portion of the lower wall portion 72 of the rear spacer main body portion 64, and is joined to the distal end portion of the lower wall portion 72 by arc welding or the like.

Moreover, a concave portion 86 that serves as a "bent portion" is formed in the vehicle vertical direction intermediate portion of the front spacer 80, at a position corresponding to the groove portion 68B of the rear spacer 62. This concave portion 86 is formed in a substantial V-shape that opens toward the vehicle front side as seen in a side view. Namely, the vertical direction intermediate portion of the front spacer 80 is disposed at the vehicle rear side of the upper end portion and the lower end portion of the front spacer 80. Further, an inclined surface 86A, that is inclined toward the vehicle rear side while heading toward the vehicle lower side as seen in a side view, is formed at the upper portion of the concave portion 86. An inclined surface 86B, that is inclined toward the vehicle rear side while heading toward the vehicle upper side as seen in a side view, is formed at the lower portion of the concave portion 86. Note that an operation hole 88 for fastening and fixing the rear spacer 62 to the rocker 20 by the bolts B is formed in the lower portion of the front spacer 80.

Here, as described above, the spacer 60 is fastened and fixed, by the bolts B, to the front cover 24 of the rocker 20, the torque box inner R/F 58 of the torque box 54, and the bulkhead 40 and the gusset 42 of the front pillar 30. Due thereto, the rocker 20 and the torque box 54 are connected by the spacer 60 from the vehicle front side, and the rocker 20 and the front pillar 30 are connected by the spacer 60 from the vehicle front side. Further the portion of the spacer 60, which portion connects the rocker 20 and the torque box 54, is made to be a first connecting portion 60A that serves as a transverse direction connecting portion, and the first connecting portion 60A extends in the vehicle transverse direction. Moreover, the portion of the spacer 60, which portion connects the rocker 20 and the front pillar 30, is made to be a second connecting portion 60B that serves as a vertical direction connecting portion, and the second connecting portion 60B extends toward the vehicle upper side from the vehicle transverse direction outer side end portion of the first connecting portion 60A.

Operation and effects of the present embodiment are described next.

In a case in which the vehicle 10, that is equipped with the vehicle body front portion structure S that is structured as described above, small-overlap-collides, the front wheel 12 moves toward the vehicle rear side and approaches the rocker 20 and the front pillar 30 (refer to the arrow in FIG. 5).

Here, at the vehicle 10, the spacer 60 is provided at the vehicle front side of the rocker 20, the torque box 54 and the front pillar 30. Further, the spacer 60 is fastened and fixed to the rocker 20 and the torque box 54, and the rocker 20 and the torque box 54 are connected by the first connecting portion 60A of the spacer 60. Due thereto, the joined portion 56 of the rocker 20 and the torque box 54 is reinforced by the spacer 60.

Further, when the front wheel 12 moves toward the vehicle rear side at the time of a small overlap collision, the front wheel 12 hits the spacer 60, and therefore, the front wheel 12 directly hitting the joined portion 56 of the rocker 20 and the torque box 54 is suppressed. Due thereto, separation at the joined portion 56 of the rocker 20 and the torque box 54 is suppressed. Accordingly, separation of the joined portion 52 of the front pillar 30 and the dash panel 50, whose origin is separation at the joined portion 56, can be suppressed.

Moreover, the front spacer 80 (the front portion) of the spacer 60 is disposed further toward the vehicle front side than the joined portion 52. Therefore, the front wheel 12 hits the spacer 60 before the dash panel 50. Further, due to the front wheel 12 hitting the spacer 60, collision load is transmitted to the rocker 20 that forms the skeleton of the vehicle body and to the torque box 54, and therefore, an excessive collision load being inputted to the dash panel 50 is suppressed. Due thereto, separation of the joined portion 52 of the front pillar 30 and the dash panel 50 can be suppressed.

Moreover, the first connecting portion 60A of the spacer 60 extends in the vehicle transverse direction and connects the rocker 20 and the torque box 54. Therefore, an increase in size of the spacer 60 can be suppressed as compared with a reinforcing panel such as that of the prior art.

Due to the above, separation of the joined portion 52 of the front pillar 30 and the dash panel 50 at the time of a small overlap collision can be suppressed, while an increase in size of the spacer 60 is suppressed.

Further, the spacer 60 is structured to include rear spacer 62 and the front spacer 80. The closed cross-sectional shape, that is substantially rectangular annular, is formed by the rear spacer 62 and the front spacer 80. Due thereto, at the time of a small overlap collision, the collision load from the front wheel 12 can be efficiently received by the spacer 60.

Moreover, the second spacer 60 has the second connecting portion 60B, and the rocker 20 and the front pillar 30 are connected by the second connecting portion 60B. Further, the second connecting portion 60B is disposed in a vicinity of the vehicle transverse direction outer side of the joined portion 52 of the front pillar 30 and the dash panel 50. Due thereto, the front wheel 12, that has moved toward the vehicle rear side at the time of a small overlap collision, hits the second connecting portion 60B, and therefore, the second connecting portion 60B receives this collision load, and can transmit this collision load to the front pillar 30 that is a skeleton member of the vehicle body. Accordingly, separation of the joined portion 52 of the front pillar 30 and the dash panel 50 can be suppressed more.

Further, the concave portion 86 is formed in the front spacer 80 of the spacer 60, and the concave portion 86 is formed in a substantial V-shape that opens toward the vehicle front side as seen in a side view. Therefore, the front wheel 12, that has moved toward the vehicle rear side at the time of a small overlap collision, can hit, for example, two regions that are the inclined surface 86A and the inclined surface 86B of the concave portion 86. Due thereto, the collision load that is inputted from the front wheel 12 to the spacer 60 can be dispersed.

Moreover, as described above, the spacer 60 is fastened and fixed by the bolts B to the rocker inner R/F 26 of the rocker 20, the bulkhead 40 and the gusset 42 of the front pillar 30, and the torque box inner R/F 58 of the torque box 54. Due thereto, the joining force with the vehicle at the spacer 60 can be ensured. Moreover, because the spacer 60 is fastened and fixed to the rocker inner R/F 26, the bulkhead 40 and the gusset 42, the collision load that is inputted to the spacer 60 at the time of a small overlap collision can be dispersed within the rocker 20 and within the front pillar 30 that form the skeleton of the vehicle body.

Further, the projecting portion 76, that opens toward the vehicle rear side as seen in a plan view, is formed integrally with the spacer 60. Therefore, because the projecting portion 76 is structured like a vertical bead, the strength of the projecting portion 76 with respect to load toward the vehicle rear side can be increased. Further, the joined portion 56 of the rocker 20 and the torque box 54 is disposed within the projecting portion 76. Therefore, because the front wheel 12 hits the projecting portion 76 whose strength has been increased, separation of the joined portion 56 of the rocker 20 and the torque box 54 can be suppressed more, and accordingly, separation of the joined portion 52 of the front pillar 30 and the dash panel 50 can be suppressed effectively.

Moreover, because the spacer 60 projects-out toward the vehicle front side with respect to the rocker 20, the front wheel 12, that moves toward the vehicle rear side at the time of a small overlap collision, can hit the spacer 60 at an early stage. Due thereto, the front wheel 12 can hit the spacer 60 in a state in which tilting of the front wheel 12, with respect to the length direction of the rocker 10 as seen in a plan view, is made to be small. This point is described hereinafter.

There are cases in which, at the time when the front wheel 12 moves toward the vehicle rear side, the front wheel 12 tilts with respect to the rocker 20 due to the collision body. Further, if the spacer 60 were to be omitted, the distance until the front wheel 12 hits the rocker 20 would be long, and therefore, there is the possibility that the tilting of the front wheel 12 with respect to the length direction of the rocker 20 at the time when the front wheel 12 hits the rocker 20 would become large. In contrast, by providing the spacer 60 at the vehicle front side of the rocker 20, the distance until the front wheel 12 hits the rocker 20 can be shortened. Due thereto, tilting of the front wheel 12 with respect to the length direction of the rocker 20 at the time when the front wheel 12 hits the rocker 20 can be made to be small. As a result, the collision load can be transmitted efficiently from the front wheel 12 to the rocker 20. Moreover, by making the tilting of the front wheel 12 with respect to the length direction of the rocker 20 small, penetration of the front wheel 12 in toward the vehicle transverse direction inner side can be suppressed in a case in which the rear portion of the wheel 12 tilts toward the vehicle transverse direction inner side as seen in a plan view.

Figure 6:
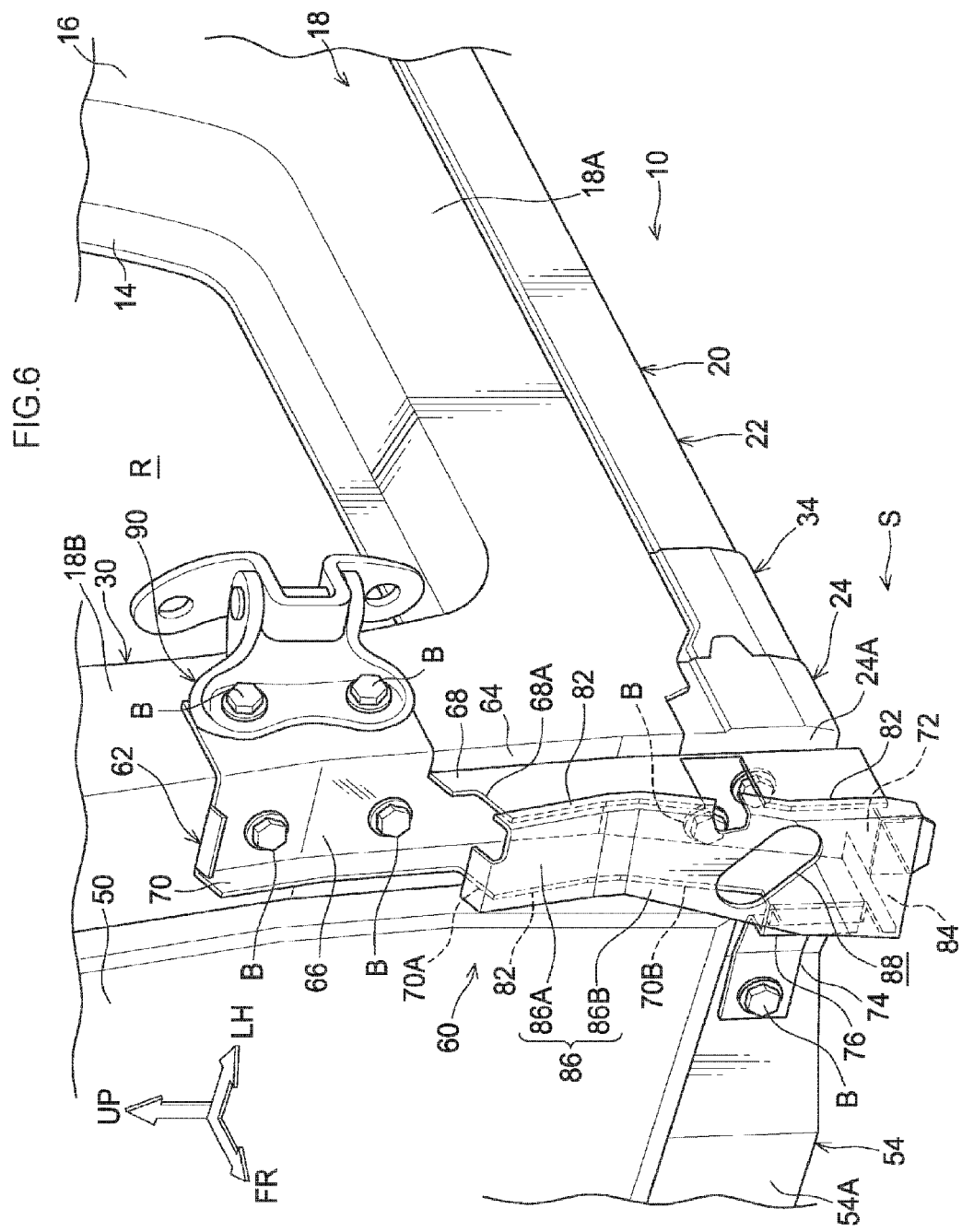
FIG. 6 is a perspective view seen obliquely from a vehicle left front side and showing another example of the spacer shown in FIG. 1.

Note that, in the present embodiment, the spacer 60 is fastened and fixed to the vehicle body at five regions, but the places where the spacer 60 is fastened and fixed can be set arbitrarily. For example, as shown in FIG. 6, there may be a structure in which the upper portion of the rear spacer 62 is bent toward the vehicle rear side, and is fastened together with a door hinge bracket 90. Further, in this case, the rear spacer 62 and the door hinge bracket 90 may be structured integrally.

Further, in the present embodiment, the inclined surface 86A and the inclined surface 86B of the concave portion 86 are tilted rectilinearly, but the inclined surface 86A and the inclined surface 86B of the concave portion 86 may be tilted in the forms of curves.

The invention claimed is:

1. A vehicle body front portion structure comprising:
   a pair of rockers that are provided at vehicle transverse direction both sides of a vehicle lower portion, and that extend in a vehicle longitudinal direction;
   a pair of front pillars that extend toward a vehicle upper side from front end portions of the rockers;
   a dash panel whose vehicle transverse direction outer side end portions are joined to front end portions of the front pillars, and that connects the pair of front pillars in a vehicle transverse direction;
   torque boxes that are provided at a vehicle lower side of the dash panel and at vehicle transverse direction inner sides of the rockers, and that are joined to the front end portions of the rockers; and
   connecting members that are provided at vehicle front sides of the rockers and the torque boxes, and whose front portions are disposed further toward a vehicle front side than the vehicle transverse direction outer side end portions of the dash panel, and that have transverse direction connecting portions that extend in the vehicle transverse direction and connect the rockers and the torque boxes,
   wherein the connecting members themselves have closed cross-sectional structures.

2. The vehicle body front portion structure of claim 1, wherein the connecting members have vertical direction connecting portions that extend toward a vehicle upper side from vehicle transverse direction outer side end portions of the transverse direction connecting portions, and that connect the rockers and the front pillars.

3. The vehicle body front portion structure of claim 2, wherein bent portions are formed at front portions of the vertical direction connecting portions, and the bent portions are formed in concave shapes that open toward a vehicle front side as seen in a side view.

4. The vehicle body front portion structure of claim 1, wherein the connecting members are fastened and fixed to reinforcing members that reinforce the vehicle body.

5. The vehicle body front portion structure claim 1, wherein
   projecting portions, that project-out toward a vehicle front side with respect to the rockers and the torque boxes and that open toward a vehicle rear side as seen in a plan view, are formed integrally with the connecting members, and
   joined portions of the rockers and the torque boxes are disposed within the projecting portions.

6. A vehicle body front portion structure comprising:
   a pair of rockers that are provided at vehicle transverse direction both sides of a vehicle lower portion, and that extend in a vehicle longitudinal direction;
   a pair of front pillars that extend toward a vehicle upper side from front end portions of the rockers;
   a dash panel whose vehicle transverse direction outer side end portions are joined to front end portions of the front pillars, and that connects the pair of front pillars in a vehicle transverse direction;
   torque boxes that are provided at a vehicle lower side of the dash panel and at vehicle transverse direction inner sides of the rockers, and that are joined to the front end portions of the rockers; and
   connecting members that are provided at vehicle front sides of the rockers and the torque boxes, and whose front portions are disposed further toward a vehicle front side than the vehicle transverse direction outer side end portions of the dash panel, and that have transverse direction connecting portions that extend in the vehicle transverse direction and connect the rockers and the torque boxes,
   wherein the connecting members have vertical direction connecting portions that extend toward a vehicle upper side from vehicle transverse direction outer side end portions of the transverse direction connecting portions, and that connect the rockers and the front pillars.

7. The vehicle body front portion structure of claim 6, wherein bent portions are formed at front portions of the vertical direction connecting portions, and the bent portions are formed in concave shapes that open toward a vehicle front side as seen in a side view.

* * * * *